F. L. NAU.
HILLER.
APPLICATION FILED AUG. 2, 1919.
1,319,607.
Patented Oct. 21, 1919.
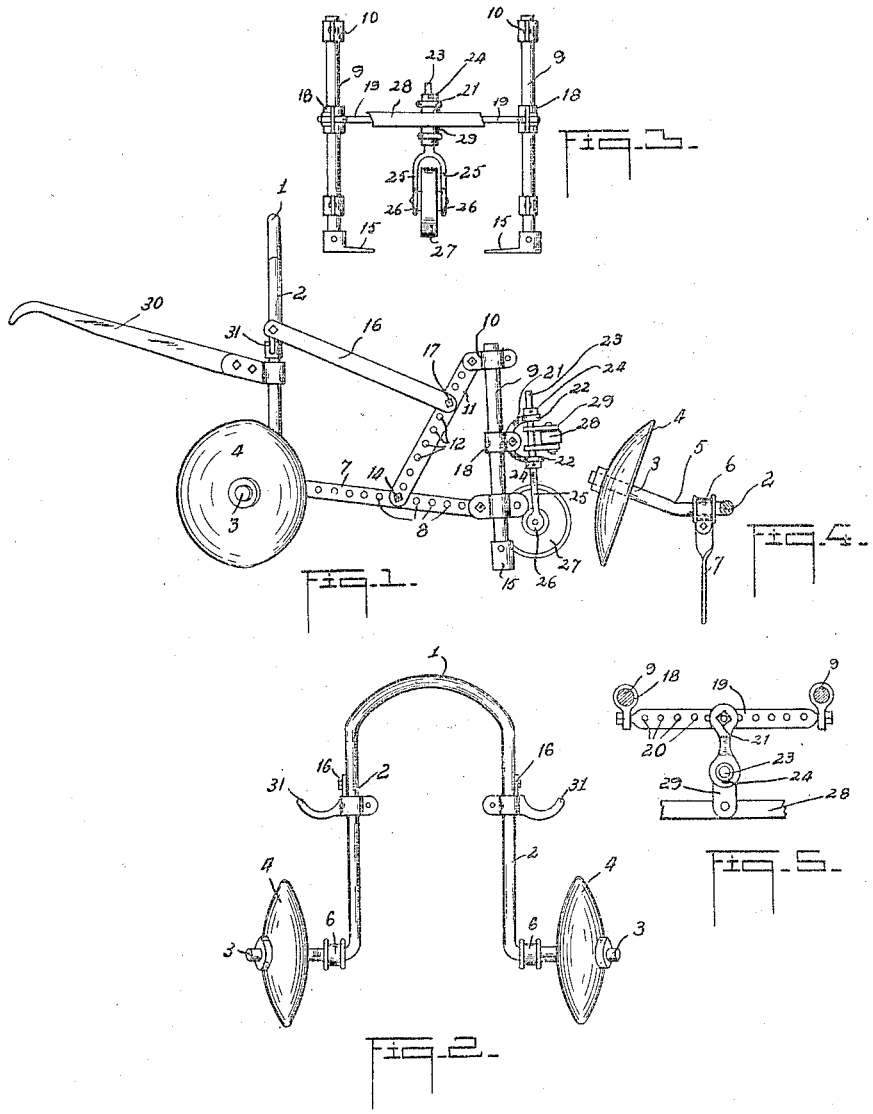

UNITED STATES PATENT OFFICE.

FRANK L. NAU, OF CROOKSTON, MINNESOTA.

HILLER.

1,319,607. Specification of Letters Patent. Patented Oct. 21, 1919.

Application filed August 2, 1919. Serial No. 314,837.

*To all whom it may concern:*

Be it known that I, FRANK L. NAU, a citizen of the United States of America, residing at Crookston, in the county of Polk and State of Minnesota, have invented certain new and useful Improvements in Hillers, of which the following is a specification.

My invention relates to hillers which may be operated by any suitable pulling power drawing it longitudinally of a row of plants for hilling or piling the soil against the plants.

An important object of this invention is to provide a hiller so that with a simple adjustment the soil may be either piled up against the plants or taken from the plants to the center of the row.

Another object of the invention is to provide a hiller with an adjustable member in the front portion thereof whereby the quantity of soil to be hilled may be accurately gaged.

A still further object of the invention is to provide a hiller having a device in the front portion for loosening the soil to be hilled.

With these and other objects in view, the invention resides in the novel combination, and arrangement of parts which will be more fully described in the following specification, illustrated in the accompanying drawing and pointed out in the appended claims.

In the drawings forming a part of this specification and wherein like numerals are employed to designate like parts throughout the same:

Figure 1 is a side view of my invention.

Fig. 2 is a rear view of the same with the guiding handles removed.

Fig. 3 is a front view.

Fig. 4 is a sectional view showing the bends of the axles.

Fig. 5 is a detail view of the draw bar.

In the accompanying drawings, wherein is shown a preferred embodiment of my invention, the numeral 1 designates an arch which has both ends extending vertically downward forming upright arms 2. The arms 2 are bent at their lower ends at an angle to form axles 3, which have fastened at their outer ends disks 4 of the usual shape and design. The axles 3 are bent on an angle as designated by 5 so that the disks will throw the soil off at an angle to form a hill.

Fastened to the axles 3 are clamps or collars 6 which are formed to receive and have secured thereto arms 7 which are perforated at intervals designated by 8 and have their opposite ends fastened to uprights 9. The uprights 9 have at their upper ends clamps 10 which have pivotally mounted, downwardly extending arms 11, which are also perforated as shown at 12. The lower extremities of the arms 11 are adjustably secured to the arms 7 by means of pins 14 passing through the perforations in the arms. Knives 15 are provided at the lowermost ends of the uprights 9 in order to loosen the soil which is afterward to be hilled by the disks 4.

Diagonally extending arms 16 are fastened to the arms 2 and have their lower ends fastened adjustably to the arms 11 by pins 17 passing through the perforations in order to permit of the adjustment of the disks to take a greater or smaller quantity of soil.

Mounted on the upright 9 are clamps 18 which have fastened thereto a drawing bar 19 which is perforated at intervals as shown at 20, so as to allow the clevis 21 to be adjustably mounted thereon.

The clevis 21 has two outwardly extending arms 22 made to receive an upright arm 23 passing through the clevis and held in position by the collar 24 and which has its lower ends fork-shaped to provide arms 25 which are widened at their lowest points to receive the axle 26 which has mounted thereon a supporting wheel 27. The whiffletree 28 may be fastened to the arm 23 by the clevis 29 which is pivotally mounted between the arms 22.

Fastened to the arms 2 are guide handles 30 and foot pedals 31. The guide handles 30 are adapted to be used for keeping the hiller in alinement with the row and the foot pedals may be used if the device is attached to other machinery where it is impossible to use the handles.

In operating my invention, the device is pulled longitudinally of the rows of plants, the pulling power being fastened to the drawing bar 19 by means before described. The disks 4 being concave and their axles 3 being bent on an angle it will be readily seen that any soil coming in contact with the disks will be thrown into a hill. The supporting wheel 27 may be raised or lowered by loosening and shifting the collars 24 in order to allow the disks to take a greater or smaller quantity of soil.

In order that the knives 15 may take a greater depth of soil, arms 11 are moved forward on the bar 7, and if it be desired to have the disks take a greater quantity of soil without adjusting the supporting wheel the arm 16 is moved downward on the arm 11, thus tilting the upright arms 2 backwardly thereby causing the disks to be forced deeper into the soil. I have here shown the disks throwing the soil inwardly, but if it be desired to throw it outwardly the arched member may be reversed.

Having thus described my invention, what I claim and desire to secure by Letters Patent is:—

1. A hiller of the character described comprising an arched member forming two upright arms bent at their lowest ends to provide axles for disks mounted thereon, said axles being bent on an angle in order to cause the disks to take a greater or smaller quantity of soil, front upright members having connected thereto a drawing bar, cultivating means at the lowest points of the said first mentioned upright members, and means for adjusting the first upright members to allow the cultivating members to loosen an increased depth of soil.

2. A hiller including an arched member, axles forming part of said arched member, disks mounted on said axles, means for adjusting said disks to allow same to take a greater or smaller quantity of soil and comprising diagonally extending arms each having one end fastened to the upright portions of the said arched member and the other free end fastened to a downwardly extending perforated arm, said diagonally extending arms having their free ends perforated to be connected with the perforations in the downwardly extending perforated arms, front upright members, and cultivating means thereon.

3. A hiller comprising an arched member, upright arms forming part of said arched member, axles bent from said upright arms with disks mounted on same, means for adjusting said disks to take a greater or smaller quantity of soil, front upright members, soil cultivating blades on the lowest ends of said front upright members, means for adjusting said upright members to take a greater depth of soil consisting of downwardly extending arms having their upper ends pivotally connected to the upper ends of said front upright members and their other free ends fastened to a longitudinally extending perforated arm, one end of said perforated arm being fastened to the axles formed by upright portions of the arched member, and their other ends to the lowest parts of the said front upright members, a drawing bar having both ends fastened to said first upright members, and means comprising a fork-shaped member having outwardly extending arms made to receive an upright arm having its lower end fork-shaped.

Signed at Crookston, Minn. this 9th day of July one thousand nine hundred and nineteen.

FRANK L. NAU.

In the presence of—
F. E. SAMSON,
ELMER TRIGEN.

Copies of this patent may be obtained for five cents each, by addressing the "Commissioner of Patents, Washington, D. C."